United States Patent [19]
Clark

[11] 3,731,197
[45] May 1, 1973

[54] SECRECY COMMUNICATION SYSTEM

[75] Inventor: John E. Clark, Ann Arbor, Mich.

[73] Assignee: Ritt Laboratories, Inc., Ann Arbor, Mich.

[22] Filed: Dec. 15, 1969

[21] Appl. No.: 885,250

[52] U.S. Cl. ....................325/32, 178/22, 325/122, 179/1.5 S
[51] Int. Cl. ....................H04k 1/00
[58] Field of Search ....................325/32, 122; 178/22, 178/5.1; 179/1.5

[56] References Cited

UNITED STATES PATENTS

| | | | |
|---|---|---|---|
| 3,188,391 | 6/1965 | Raymond et al. | 179/1.5 S |
| 2,453,659 | 11/1948 | DeReginauld DeBellescize | 178/22 |
| 2,629,012 | 2/1953 | Ehrat | 178/22 |
| 2,995,624 | 8/1961 | Watters | 178/22 |
| 3,029,308 | 4/1962 | Adler et al | 179/1.5 |

*Primary Examiner*—Rodney D. Bennett, Jr.
*Assistant Examiner*—H. A. Birmiel
*Attorney*—Barnes, Kisselle, Raisch & Choate

[57] ABSTRACT

A secrecy communication system wherein an input signal is sampled at the encoder by electronic sample-and-hold circuits, each of which includes a capacitor to temporarily hold a sample. The input signal is sampled at contiguous intervals and at a rate selected according to the sampling theorem of at least twice the highest frequency component in the input signal. The samples are read from the capacitors in a rearranged abnormal order to obtain unintelligible secured signals. The decoder at a receiver essentially operates in a reverse sequence from the encoder to reconstruct the original input signal. The sample-and-hold circuits are arranged in groups so that while information is read into one group of capacitors, samples are simultaneously read from capacitors in another group.

29 Claims, 12 Drawing Figures

INVENTOR
JOHN E. CLARK

BY

Barnes, Kisselle, Raisch & Choate
ATTORNEYS

INVENTOR
JOHN E. CLARK

BY

Barnes, Kisselle, Raisch & Choate
ATTORNEYS

INVENTOR
JOHN E. CLARK

BY

Barnes, Kisselle, Raisch & Choate
ATTORNEYS

SECRECY COMMUNICATION SYSTEM

This invention relates to secrecy communication systems and more particularly to such systems wherein samples of the intelligence signal are temporarily stored electronically, as by a capacitor, so that the samples are available for reading in an abnormal sequence which provides an unintelligible secured signal.

Secrecy communication systems are known, for example, with telephone communication systems, wherein the intelligence signal is broken into a number of different units and then the units are rearranged and transmitted in an abnormal sequence. Such systems generally employ magnetic tape or other magnetic recording media and the intelligence signal is recorded continuously over a predetermined time interval. Incremental portions of the recorded signal are then rearranged, for example, by switching between a plurality of read heads in an abnormal sequence or by introducing different time delays for increments read by either single or multiple heads. Prior art systems are typified by those described in U. S. Pat. No. 2,401,888, granted to James Ernest Smith on June 11, 1946; U.S. Pat. No. 2,406,352, granted to Wilden A. Munsen on Aug. 27, 1946; and U.S. Pat. No. 3,012,099, granted to Aloysius Busch et al on Dec. 5, 1961. However, systems incorporating magnetic recording have certain disadvantages due, in part, to inherent limitations of magnetic recording and of associated mechanical devices such as motors, rotary switches, tuning forks, gears, levers, etc. In prior art secrecy systems using magnetic tape recording, a typical recording interval, i.e., the separation of increments to be rearranged, might be on the order of 50 milliseconds at typical recording speeds. Practical lower limits on the recording interval impose a practical upper limit on the available number of code versions. Such prior art systems also have practical disadvantages inherent in mechanical components such as manufacturing cost, servicing and size.

Objects of the present invention include providing a secrecy communication system that is compatible with a wide variety of existing unsecured transmission systems; that can be added to available unsecured transmission systems without fundamental modification of existing equipment; that can provide a wide variety of scrambled versions of the unsecured signal without impairing reproducibility of the original signal; that operates essentially on a "real-time" basis with little if any noticeable time delay between transmission and reception of a secured message; that deters decoding by a person possessing a decoding device without knowledge of the required decoding sequence; that is more reliable, maintenance free, longer lifed and more compact as compared to the aforementioned magnetic recording systems; and/or that achieves effective, secured transmission for a wide variety of applications.

According to one important aspect of the present invention, recording of the audio signal is accomplished by storing a consecutive sequence of samples of the audio input signal on a number of capacitors as opposed to conventional recording on magnetic tape. The correct number and spacing of the discrete audio samples needed to specify all of the intelligence in the audio signal, and hence necessary to record all of the intelligence in the audio signal, is determined by the well-known sampling theorem. The sampling theorem states that any continuous signal having frequency components no higher than W cycles per second can be determined by specifying its ordinates at discrete points spaced 1/2W seconds apart. In other words, sampling and specifying the audio signal at least twice per cycle of the highest frequency component contained in the audio signal is necessary and sufficient to determine the original function. Hence when the band of frequencies contained in the audio signal has an upper frequency limit of W cps, but not necessarily starting at zero, 2W samples per second are still necessary and sufficient although a different formula for spacing the samples may apply. For numerous applications involving voice communication, such as telephone communication and police radio, the sampling may be at intervals of approximately 0.2 milliseconds to obtain a useful reproduction of the original signal.

Other objects, features and advantages of the present invention will become apparent in connection with the following description, the appended claims and the accompanying drawings in which:

Figure 1:
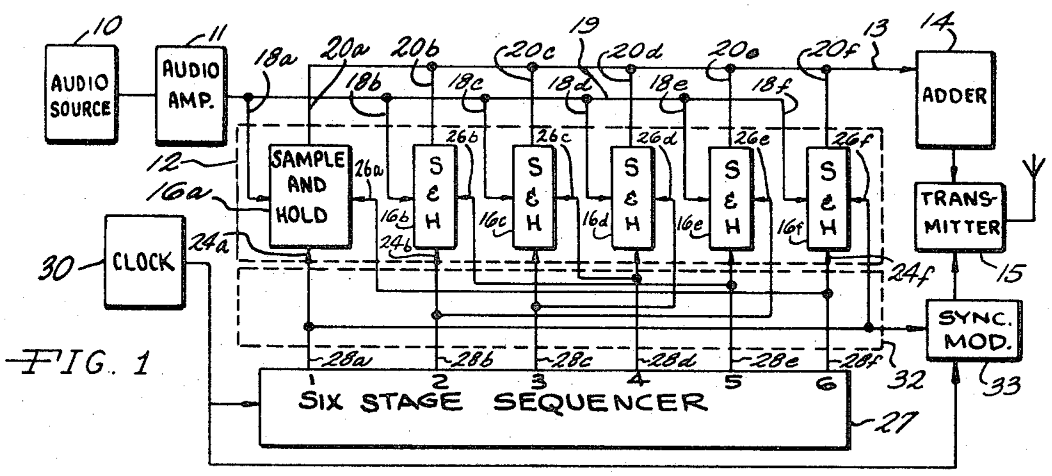
FIG. 1 is a functional block diagram of a transmitter portion of one embodiment of a secured transmission system incorporating a six-stage, sample-and-hold encoder.
Figure 2:
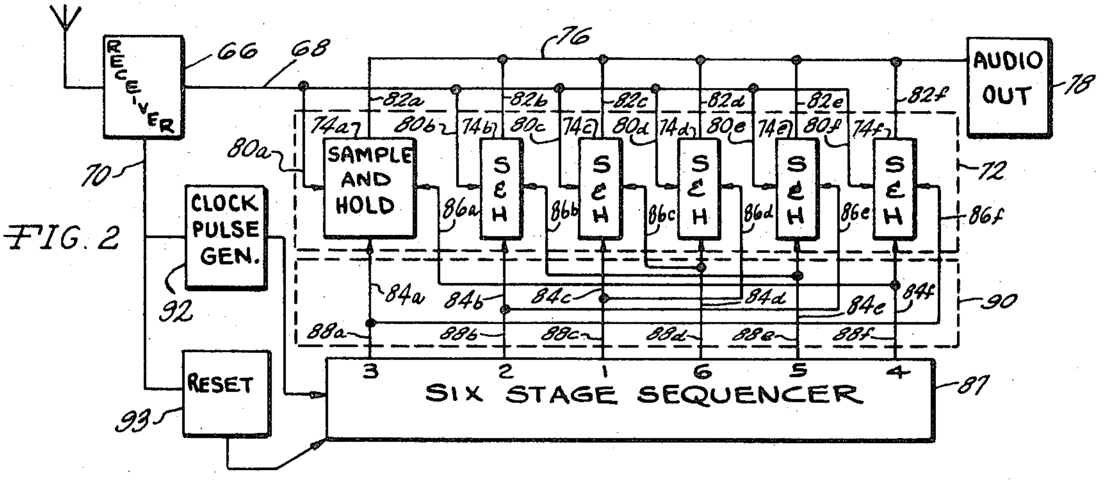
FIG. 2 is a functional block diagram of a receiver having a six-stage, sample-and-hold decoder for use with the transmitter of FIG. 1.
Figure 3:
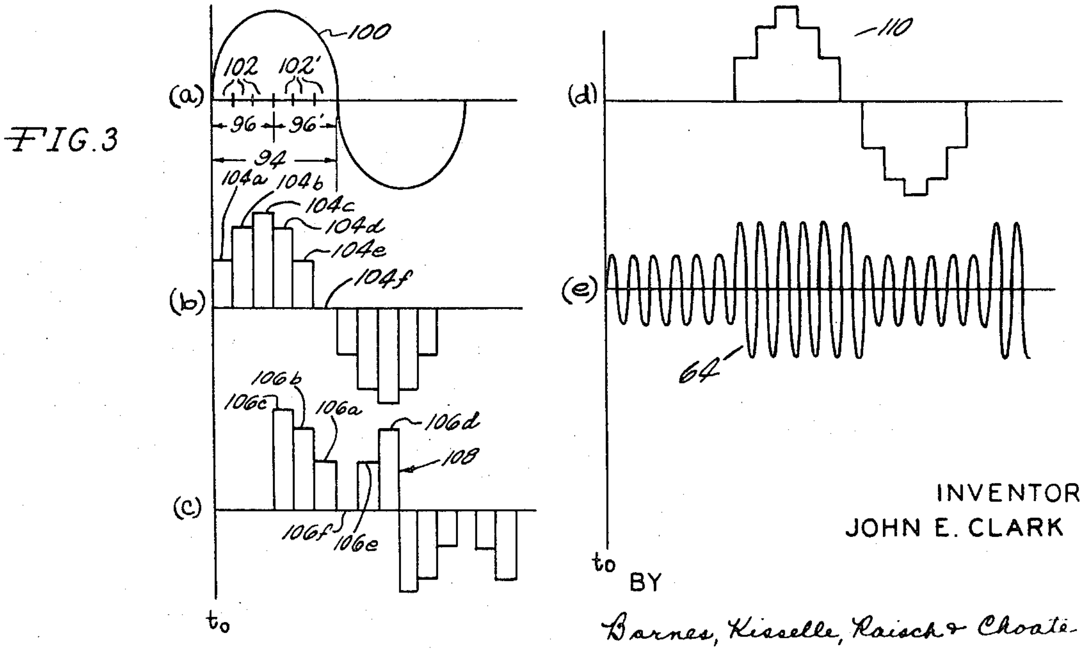
Figure 4:
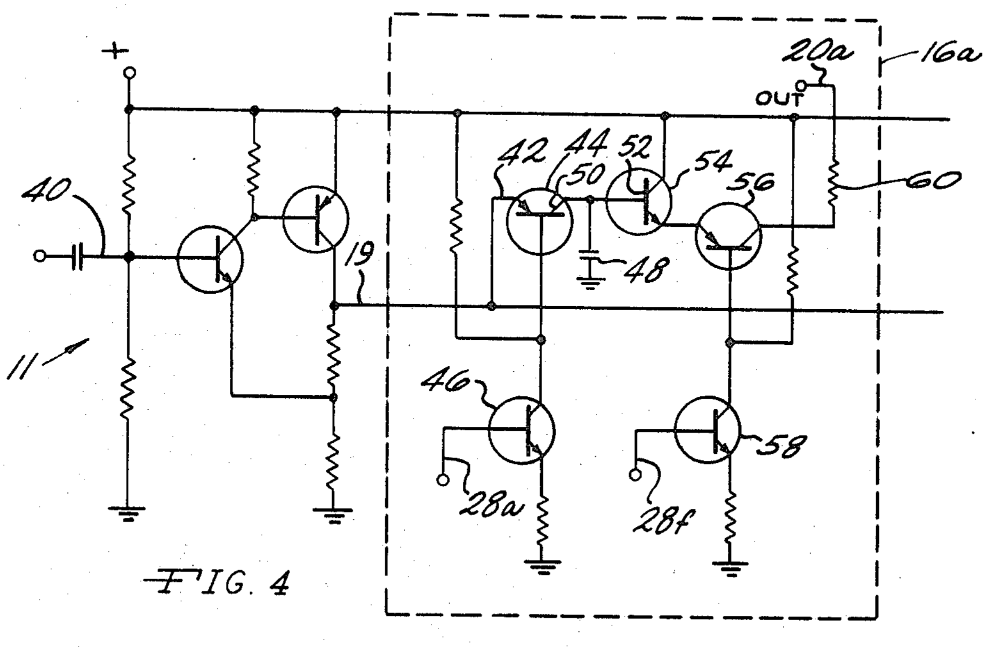
Figure 5:
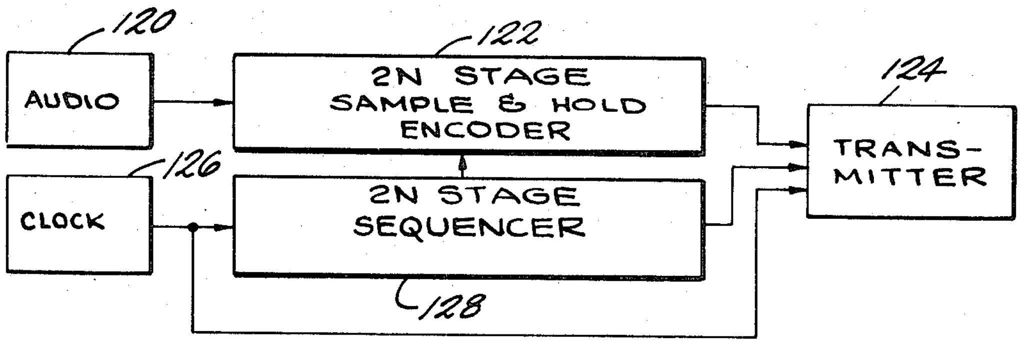
Figure 6:
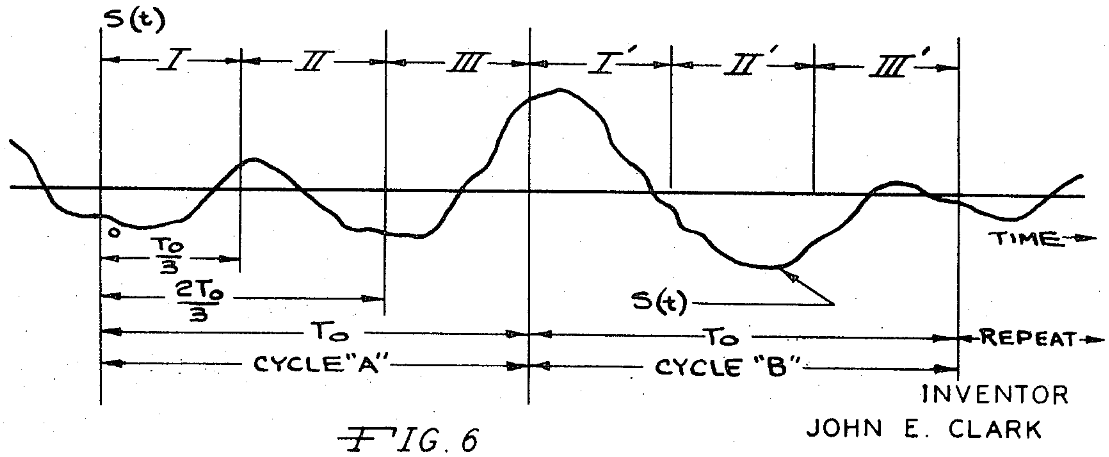
Figures 7, 8:
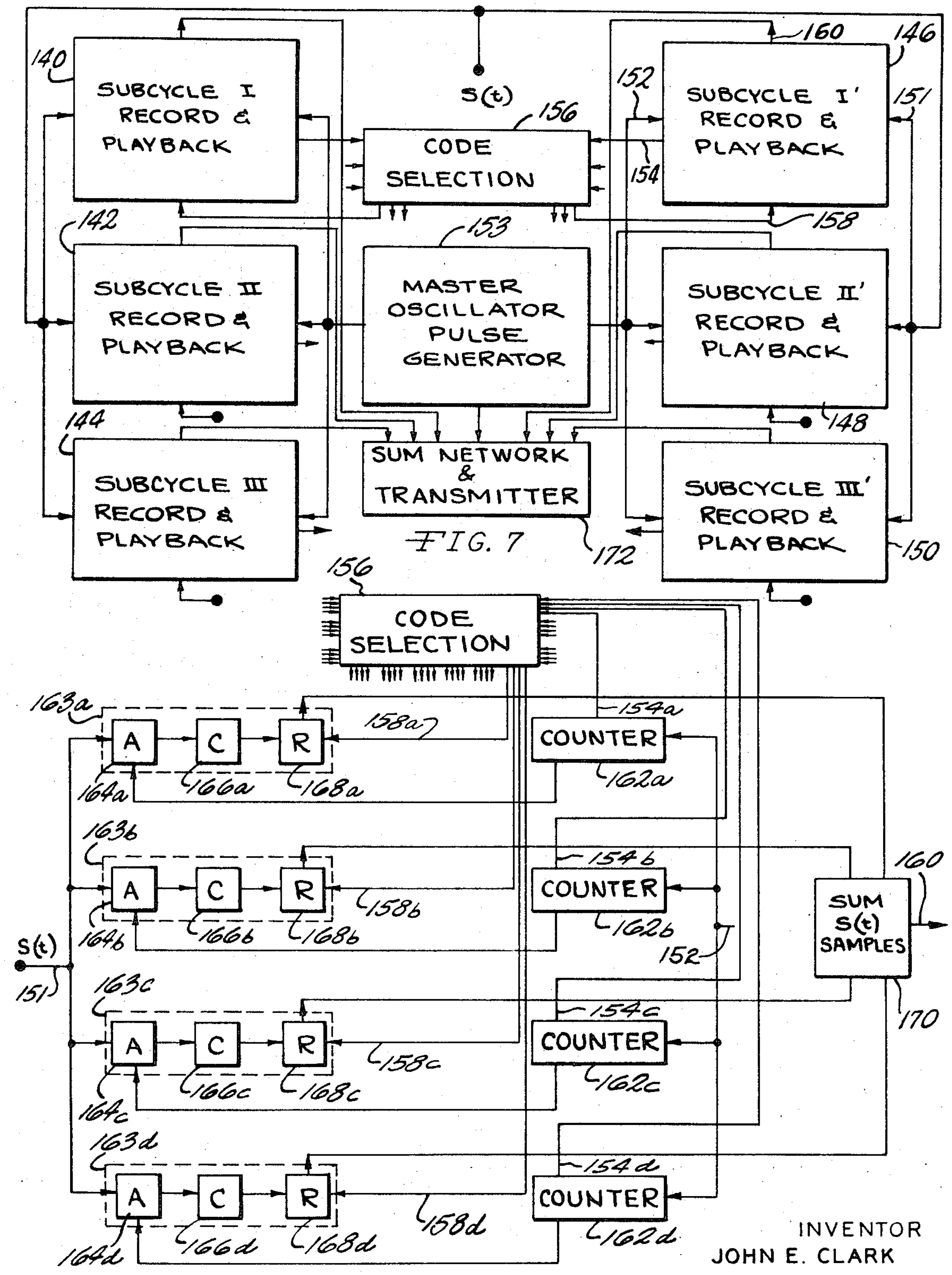

FIGS. 3 *a–e* are waveforms illustrating the operation of the transmitter and receiver of FIGS. 1 and 2, respectively;

FIG. 4 is a schematic circuit diagram of a solid state sample-and-hold circuit used in the encoder and decoder of FIGS. 1 and 2;

FIG. 5 is a functional block diagram illustrating another more general embodiment of the secured communication system of the present invention;

FIG. 6 is a waveform illustrating secured transmission according to a further embodiment;

FIG. 7 is a functional block diagram of the transmitter for the embodiment associated with the waveform of FIG. 6; and FIG. 8 is a more detailed block diagram of a record-and-playback circuit for one subcycle in the encoder for the transmitter of FIG. 7.

Referring more particularly to FIG. 1, audio signals from an audio source 10 are fed through an audio amplifier 11 to an encoder 12 having six sample-and-hold stages 16*a* through 16*f*. For simplicity, like components associated with like stages are designated by like numerals but different letter suffixes for different stages. The output samples developed by the six circuits 16 *a–f* are collected on a coded audio bus 13 and fed to an analog adder 14 which sums the samples in time sequence and feeds the coded audio output to a transmitter 15.

The sample-and-hold circuits 16 have respective signal inputs 18 *a–f* connected to amplifier 11 via an audio input bus 19; respective outputs 20 *a–f* connected via bus 13 to adder 14; respective sample instruction inputs 24 *a–f;* and respective read instruction inputs 26 *a–f*. A six-stage sequencer 27 driven by a clock pulse source 30 develops a repetitive sequence of six gating pulses at outputs 28 *a–f*, for example, in the sequence 1–2–3–4–5–6 designated in FIG. 1. The gating pulses are distributed from sequencer 27 to the six sample inputs 24 *a–f* and to the six read inputs 26 *a–f* by a code selection device 32 enclosed by dashed lines and illustrated in FIG. 1 as set for a fixed rearranging sequence.

In the preferred embodiment, sequencer 27 comprises a six-stage ring counter such that there is a one-to-one correspondence between the number of input pulses from clock 30 and the number of sequencer output pulses at 28 *a–f*. The output from sequencer 27 is taken from the appropriate stage in the ring counter so that, for example, the first stage generates an output pulse at 28*a* in response to a first pulse from source 30, the second stage generates an output pulse 28*b* in response to the second pulse from source 30, and similarly up to the sixth stage which generates an output pulse at 28*f* in response to the sixth pulse from source 30. The ring counter repeats the pulse sequence automatically beginning at output 28*a* through output 28*f* in response to the seventh through 12th pulses from source 30 and so on. As illustrated by the fixed connections in the code selection device 32 from sequencer 27 to the sample inputs 24 *a–f* and to the read inputs 26 *a–f*, the sample-and-hold circuits 16 *a–f* receive sample instructions sequentially from left to right as viewed in FIG. 1 and read instructions in the reverse sequence, i.e., from right to left as viewed in FIG. 1. Although the code selection device 32 has been illustrated with fixed connections in FIG. 1, the read sequence can be varied by suitable selector switches (not shown) or the like incorporated in the code selection device 32. Additionally, the connections illustrated in FIG. 1 in the code selection device 32 utilize a gate pulse from sequencer 27 to simultaneously sample at one sample-and-hold circuit and simultaneously read from another sample-and-hold circuit. Separate six-stage sequencers, both synchronized by source 30, could be used, one sequencer providing sample instructions and the other sequencer providing read instructions. However, simultaneous sampling and reading at two of the sample-and-hold circuits 16 in response to a single gate pulse is preferred.

Clock pulses from source 30 are also fed to an amplitude modulator 33 which provides a sync signal to transmitter 15. Transmitter 15 includes the usual modulator (not shown) to transmit the coded audio from adder 14 and the sync signal from modulator 33 at a suitable carrier frequency. The sync signal 64 (FIG. 3*e*) is amplitude modulated so that alternate groups of six pulses have different amplitude levels. Timing of the change in amplitude level at modulator 33 is obtained by the gate pulse from output 28*a* at sequencer 27. Other suitable synchronizing techniques could be used. For example, source 30 could be replaced by a corresponding clock pulse generator which also provides a separate start pulse at the beginning of each group of six gate pulses. The start pulse would cause the next gate pulse to enter a sample at the first sample-and-hold stage 16a and synchronize decoding at the receiver.

Referring to the first sample-and-hold stage 16*a* illustrated in FIG. 4, the audio signal from source 10 is applied to input lead 40 of amplifier 11. Amplifier 11 is suitably constructed to exhibit a low output impedance so that the amplifier output is not loaded when a sample of the audio signal is taken at bus 19. The audio at bus 19 is coupled to the emitter 42 of a sampling transistor 44 which in turn is controlled by a gating transistor 46 that receives a sample instruction gate pulse from the output 28*a* of sequencer 27. In the absence of a gate pulse at 28*a*, transistor 46 is normally nonconducting to maintain transistor 44 nonconducting. Transistor 44 is a high beta silicon transistor having a low collector-emitter saturation voltage. The output of transistor 44 at collector 50 charges a storage capacitor 48 which in turn is coupled to base 52 of a transistor 54. Transistor 54 is direct emitter coupled to a second transistor 56. Transistor 56 is in turn controlled by a gating transistor 58 in response to gate pulses at 28*f*. The transistor pair 54, 56 exhibits a high input impedance at base 52. In the absence of a gate pulse at 28*f*, transistor 58 is normally nonconducting to maintain transistors 54, 56 nonconducting. The transistor pair 54, 56 is arranged to develop the sample output at 20*a* through resistor 60.

In response to a positive gating pulse at 28*a*, transistor 46 is turned on to turn transistor 44 on and charge capacitor 48 in accordance with the audio signal at bus 19. At the end of the sampling pulse at 28*a*, transistor 44 is turned off to terminate charging of capacitor 48. The sampling pulse at 28*a* has a duration substantially equal to an entire sample interval as will be subsequently described. During the sample interval, the voltage at capacitor 48 closely follows the audio input at bus 19 so that when transistor 44 is turned off at the end of the sampling interval, the voltage at capacitor 48 will correspond to the amplitude of the audio signal at the end of the sampling interval. In response to a gate pulse at 28*f*, transistor 58 is turned on to in turn render transistors 54, 56 conducting. For the duration of the gate pulse at 28*f*, transistors 54, 56 develop a level DC signal at the output 20*a* corresponding to the voltage at capacitor 48. In the interval between the sample instruction gate pulse at 28*a* and the read instruction gate pulse at 28*f*, the charge on capacitor 48 is held temporarily without leakage so that the output at 20*a* corresponds identically to the level of the audio at bus 19 at the end of the sampling interval. At the end of the read gating pulse at 28*f*, transistor 58 is turned off to render transistors 54, 56 non-conducting. With proper selection of the components for sample-and-hold circuit 16*a* described hereinabove, capacitor 48 need not be separately reset at the end of the sampling period. The response time of capacitor 48 and transistor 44 is such that with the next sample instruction gate pulse at 28*a*, the voltage at capacitor 48 can follow the instantaneous amplitude of an audio signal at bus 19 during the next sampling interval.

Referring to FIG. 2, the secured signal from transmitter 15 is received at receiver 66 which demodulates the carrier frequency signal and provides a coded audio signal at bus 68 and a sync signal at lead 70. The coded audio at bus 68 corresponds to the coded audio output from adder 14 whereas the sync signal at 70 has a waveform corresponding to the synchronizing signal 64 generated by modulator 33. The coded audio signal at bus 68 is fed to a decoder 72 having six sample-and-hold stages 74 *a–f* whose outputs are collected at bus 76 and summed at an analog adder 78. The construction and operation of decoder 72 corresponds substantially to the construction and operation of encoder 12 except that the decoder is arranged to perform a reverse sequence to reconstruct the audio signal originating at source 10. Hence the sample-and-hold circuits 74 *a–f* have respective inputs 80 *a–f* coupled to coded audio bus 68; sample outputs 82 *a–f* coupled to bus 76; respective sample instruction inputs 84 *a–f* and respective read instruction inputs 86 *a–f*. Inputs 84 and 86 are selectively connected via a code selection device 90 to the six gate pulse outputs 88 *a–f* of a six-stage sequencer 87.

The sync signal at 70 is separated by conventional separation techniques at receiver 66 and fed to a gated clock pulse generator 92 and to a reset circuit 93. Synchronizing is obtained by detecting the envelope of the sync waveform 64, for example, a zero crossing at the amplitude level change. Since the gate pulse from output 28*a* of sequencer 27 at the encoder 12 causes the change of sync amplitude level, the reset circuit 93 resets all of the counter stages in the sequencer 87 of the decoder 82 so that the next clock pulse from generator 92 causes an output to be developed at output 88*c* in the sequencer 87. However, other suitable synchronizing techniques can be used so that, generally speaking, the decoder knows what the encoder is doing, i.e., the read sequence at encoder 12 and which stage 16 generated a given coded signal sample at bus 68.

In the preferred embodiment, sequencer 87 comprises a six-stage ring counter clocked by pulse generator 92. The outputs at 88 *a–f* of sequencer 87 are taken at the appropriate stage of the ring to provide the sequence 3–2–1–6–5–4 designated in FIG. 2. Stated differently, the first gate pulse after reset is developed at output 88*c* in response to the first pulse from generator 92, the second gate pulse at output 88*b* in response to the second clock pulse, the third gate pulse at 88*a* in response to the third clock pulse, the fourth gate pulse at 88*f* in response to the fourth clock pulse, the fifth gate pulse at 88*e* in response to the fifth clock pulse and the sixth gate pulse at 88*d* in resonse to the sixth clock pulse.

The operation of the secrecy communication system described hereinabove may best be understood in connection with the waveforms illustrated in FIG. 3 wherein the horizontal axis represents time and the vertical axis represents amplitude. For convenience, the system described hereinabove may be characterized as a two-cycle code since over the period 94, samples are taken over the period or cycle 96 and then read in a rearranged sequence while samples are taken over the second cycle 96'. There are three sampling intervals 102 during cycle 99 and three intervals 102' during cycle 96'. For purposes of simplicity, an audio signal 100 is illustrated as one cycle of a sine wave whose half-cycle duration, again for purposes of simplifying the description, is illustrated as corresponding to six even sampling intervals 102, 102'. Capacitors 48 *a–f* in the sample-and-hold circuits 16 *a–f* are all assumed to be at zero charge. At time $t_o$, sequencer 27 generates a gate pulse at output 28*a* over the first sampling interval 102. During the first sampling interval 102, transistor 44*a* is turned on so that the voltage at capacitor 48*a* follows the uncoded audio signal at bus 19. Hence at the end of the first interval 102, capacitor 48 will be charged to the level illustrated by the voltage level 104*a* in FIG. 3*b*. During the second and third sampling intervals 102, the respective capacitors 48*b* and 48*c* in the sample-and-hold circuits 16*b* and 16*c* will be charged to the respective voltage levels 104*b* and 104*c*. It will be appreciated that the waveform of FIG. 3*b* is not actually generated as a function of time by the circuit of FIG. 1. FIG. 3*b* merely illustrates the voltage levels at capacitors 48 at intervals corresponding to the sample intervals 102, 102'.

During the first three intervals 102, the three sample-and-hold circuits 16*f*, 16*e*, 16*d* are read sequentially in that order. Since it was assumed that capacitors 48*f*, 48*e* and 48*d* were at zero voltage, no output is present at the coded output bus 13 as illustrated by the zero level for the coded audio signal 108 (FIG. 3*c*) during the first three intervals 102. In response to the fourth gate pulse at output 28*d*, the audio signal at bus 19 is sampled at capacitor 48*d* as illustrated by the voltage level 104*d*. Simultaneously, the voltage level 104*c* at capacitor 48*c* is read to provide a level output signal 106*c* (FIG. 3*c*) at bus 13 during the fourth pulse interval. In a similar manner, the fifth and sixth gate pulses at 28*e* and 28*f* cause capacitors 48*e* and 48*f* to be charged to the levels 104*e* and 104*f*, respectively, and simultaneously cause capacitors 48*b* and 48*a* to be read consecutively in that order to provide the coded audio portions 106*b* and 106*a* in FIG. 3*c*. The coded audio samples at bus 13 are added in time sequence by adder 14 to develop the coded audio signal 108. The coded audio signal 108 has a substantially continuous waveform because the sample intervals are contiguous. By proper selection of the pulse width ratio at source 30, there is no noticeable separation between consecutive sampling intervals 102. The repetition rate of the clock pulse train from source 30 is selected according to the aforementioned sampling theorem to obtain a useful reproduction at the receiver. However, this is not apparent in FIG. 3 due to the scale of FIG. 3 and shape of the waveforms chosen for simple illustration.

The coded audio signal 108 (FIG. 3*c*) also represents the demodulated coded audio signal at bus 68 (FIG. 2), both with respect to amplitude and phase relative to the original audio signal 100. During the first three intervals at the receiver corresponding to the first three intervals 102, no information will be either entered in or read out of the sample-and-hold circuits 80*c*, 80*b*, 80*a* in response to the first three gate pulses at outputs 88*c*, 88*b* and 88*a*. In response to the next three gating pulses, the fourth, fifth and sixth pulses generated sequentially at outputs 88*f*, 88*e*, 88*d* in that order, the capacitors (corresponding to capacitors 48) in the sample-and-hold circuits 80*f*, 80*e*, 80*d* will, in that order, be charged to levels corresponding to the levels 106*c*, 106*b*, 106*a* (FIG. 3*c*). The seventh gating pulse developed at output 88*c* charges the capacitor in sample-and-hold circuit 80*c* to the level 106*f* and simultaneously reads the voltage level 106 *a* at the capacitor in sample-and-hold circuit 80*d*. Similarly, the eighth and ninth pulses at 88*b* and 88*a* read levels 106*b* and 106*c* at circuits 74*e* and 74*f* and store the levels 106*e* and 106*d* in circuits 74*b* and 74*a*, respectively. As the decoding progresses, the samples are reordered and a reconstructed audio signal 110 is developed at the audio output circuit 78. Suitable filtering or smoothing is provided in the audio output circuit 78 for most applications.

FIG. 5 illustrates another general embodiment of the secured communication system according to the present invention wherein audio signals from source 120 are fed to a sample-and-hold encoder 122. Output samples from encoder 122 are generated in an abnormal sequence according to instructions from sequencer 128 and fed to the transmitter 124. Sequencer 128 also provides a sync pulse to transmitter 124. For simplicity, the analog adder corresponding to adder 14 in FIG. 1 is not separately illustrated since it may be conveniently incoporated in input circuits at transmitter 124. Similarly, for simplicity, code selection generally corresponding to device 32 in FIG. 1 may be incorporated in sequencer 128. The clock pulse train from source 126 is also fed to transmitter 124 to generate the sync signal for the receiver, for example, by either the amplitude modulation or the separate start pulse techniques previously described. Encoder 122 has 2N number of sample-and-hold stages where N is the number of samples over one recording "cycle" which generally corresponds to the cycle 96 in FIG. 3. Each encoding cycle can be considered as comprising $\theta$ number of subcycles. Sequencer 128 is arranged to record (sample) the input signal in normal order over a period of 2N sampling intervals and then read the samples in an abnormal sequence of subcycles each containing $2N/\theta$ number of samples. While N number of samples for one subcycle are recorded, N number of samples in another subcycle are read. The $2N/\theta$ number of samples within a subcycle may be read in normal order since secured audio can be obtained by the aforementioned abnormal sequence in the subcycles of the coded audio.

A specific embodiment of the secrecy communication system described in connection with FIG. 5 will be more apparent from FIGS. 6–8. In FIG. 6, time is represented on the horizontal axis and variations as a function of time $S(t)$ are represented on the vertical axis. Time periods of the function $S(t)$ may be designated as follows:

$0 \leq S(t) \leq T_o \equiv$ cycle A $T_o \leq S(t) \leq 2T_o \equiv$ cycle B

Cycles A and B may be designated as comprising the time periods:

$0 \leq S(t) \leq T_o/3 \equiv$ subcycle I $T_o/3 \leq S(t) \leq 2T_o/3 \equiv$ subcycle II $2T_o/3 \leq S(t) \leq T_o \equiv$ subcycle III $T_o \leq S(t) \leq 4T_o/3 \equiv$ subcycle I'

$4T_o/3 \leq S(t) \leq 5T_o/3 \equiv$ subcycle II'

$5T_o/3 \leq S(t) \leq 2T_o \equiv$ subcycle III'

Samples of $S(t)$ are recorded in normal order at contiguous time intervals over the entire cycle A. While the samples for cycle B are recorded, the samples in cycle A are read and transmitted in normal order within the subcycle A but with reverse rearranging of subcycles, i.e., subcycles III, I, II, in that order. At the completion of reading and transmitting of cycle A, cyclc B is then transmitted and read in reverse subcycle order while simultaneously the corresponding next A cycle is recorded. The complexity of an abnormal subcycle sequence can be increased by extending the lengths of the cycles A and B to include more subcycles or by using an abnormal order other than a simple reverse order. Where the samples within each subcycle are read and transmitted in normal sequence, the duration of the subcycle should be short enough to forestall deciphering. On the other hand, the complexity of the sequence can be increased by rearranging sampled increments within each subcycle when the subcycle is read, for example, reading samples in a reverse sequence within a subcycle.

Implementation of the embodiment described in connection with FIG. 6 is illustrated in FIGS. 7 and 8 wherein four samples are taken during each of six subcycles. Six record-and-playback circuits 140, 142, 144, 146, 148, 150 for subcycles I, II, III, I', II', III', respectively, are shown in FIG. 7 and a more detailed illustration of one record-and-playback circuit 146 for subcycle I' is shown in FIG. 8. Since each of the record-and-playback circuits are substantially identical, only the circuit 146 for subcycle I' will be described in detail. The six record-and-playback circuits each have a signal input at 151 that receives the time varying signal $S(t)$; a clock input at 152 coupled to the master oscillator pulse generator 153; four read instruction outputs 154 *a–d* coupled to a code selection circuit 156; four read instruction inputs 158 *a–d;* and a sample output 160. Each record-and-playback circuit also includes four "-scale-of-24" counters 162 *a–d* and four sample-and-hold circuits 163 *a–d*. Circuits 163 generally correspond to the sample-and-hold circuit 16 (FIG. 1) and each comprise a sample AND gate 164 *a–d* (A), a sample storage capacitor 166 *a–d*, and a sample read gate (R) 168 *a–d*. The 24 counters 162, four from each of the six playback and record circuits, are all driven by generator 153. The outputs are taken at respective counters 162 to provide an output pulse at a different prescribed count, from one to 24. The gate pulse operates an associated sample gate 164 to sample one interval of the signal $S(t)$. The gate pulse is also simultaneously distributed through the code selection circuit 156 to a read gate 168 of a different subcycle record-and-playback circuit. For example, for reverse subcycle ordering in the record-and-playback circuit 146 shown in FIG. 8 (with normal order within a subcycle), counters 162*a*, 162*b*, 162*c*, 162*d* provide respective gate pulses in response to the 10th through 13tn pulses, in that order, from generator 153. These four pulses actuate gates 164*a*, 164*b*, 164*c*, 164*d*, in that order, to record consecutive samples at capacitors 166*a*, 166*b*, 166*c*, 166*d*. The four pulses are distributed through the code selection circuit 156 to the corresponding read gates 168 in the record-and-playback circuit 144 for subcycle III. Similarly, circuit 146 receives read instructions from circuit 144. The outputs from the four read circuits 168 *a–d* are summed at the analog adder 170 and the outputs from the six adders 170 are in turn summed at the sum network and transmitter 172 (FIG. 7). Timing information from generator 153 is also fed to the transmitter 172 for generating the synchronizing signal to maintain the decoder at the receiver in step with the encoder at the transmitter.

In operation, the signal to be encoded, $S(t)$, is applied continuously to all six record-and-playback circuits 140–150 and hence to all 24 gates 164 in the record-and-playback circuits. All 24 counters 162 accept a continuous train of pulses from the generator 153 which itself generates one start pulse for every 24 pulses generated. The start pulse is fed to transmitter 172 to synchronize the receiver and to all 24 counters 162 to preset counters 162 such that the first counter of the subcycle I circuit 140 generates a pulse on the first pulse from generator 153, the second counter generates a pulse on the second pulse, etc. Hence for each pulse of the generator 153, there exists exactly one counter 162 which generates a gate pulse output. Further, the counters 162 generate the gate pulses in sequence from one through 24 and then repeat the sequence.

Each counter output pulse causes its associated sample-and-hold circuit 163 to sample the function S($t$) and store the sample until it is read. Each output from counters 162 is also applied to a read gate 168 such that for every sample recorded in cycle A, a sample is read from cycle B, and vice versa. The selection of the connection between counters 162 and gates 168 via circuit 156 provides the coding of S($t$). The arbitrary preselection of the coding sequence can be selected by a pair of users through simple switching techniques. Suitable rotary switches or other multiple position switches, such as punched cards or paper tape, can be used to accomplish the coding sequence selection. A pair of users simply selects the same switch positions or identical punched cards (or tape) to obtain the correct timing sequence.

The samples of S($t$) from four gates 168 in each subcycle circuit are combined in adder 170 in time sequence and the coded signal from all six adders are combined in time sequence at network 172. Only one sample of S($t$) is present in the sum network 172 at any one instant of time. The decoding process is accomplished conceptually by reordering the arbitrary sequence of recorded subcycles. The reordering process to reconstruct the function S($t$) is implemented with essentially the same device as is used to obtain the sequence from S($t$), as will be apparent from corresponding descriptions in connection with FIGS. 1 and 2.

It will be understood that the secured transmission system has been described hereinabove for purposes of illustration. One preferred embodiment of the present invention was an expanded version of the circuits illustrated in FIGS. 1–3 having sixteen sample-and-hold stages corresponding to the six stages 16 *a–f*. This particular transmission system is intended primarily for mobile radios and telephones. In the specific embodiment incorporating 16 sample-and-hold stages, the sample intervals corresponding to intervals 102, 102′ of FIG. 3 is 0.2 milliseconds. 16 samples are read and rearranged by the encoder in a reverse sequence in a manner corresponding to that described in connection with FIGS. 1–3 for the six-stage system. Hence the interval over which the 16 samples are rearranged is approximately 3.2 milliseconds. With this sample duration and number of samples together with reading of contiguous samples in a reverse sequence, the resulting bandwidth of the coded audio signal is generally compatible with bandwidth requirements for mobile and telephone communication. However, a filter was included in the output of the audio amplifier to limit the bandwidth of the original audio signal prior to encoding so that a more acceptable bandwidth in the coded audio signal was obtained. The bandwidth of the coded audio signal is the bandwidth of the original audio plus and minus a spreading factor that is related to the number of contiguous audio samples. In general, this spreading factor is approximately the inverse of the sampling interval multiplied by the number of contiguous audio samples. Hence for the 16-stage example, the original bandwidth is expanded by approximately 330 cycles per second at each end of the band or a total of 660 cycles per second. For voice communication, the normal telephone bandwidth may be on the order of from 200 or 300 cps up to 2,700 cps or a bandwidth of approximately 2,300 cps. As a practical matter, the lower frequency expansion of the bandwidth is not significant since the lower frequencies are lost in telephone communication without degrading the signal. With the 16-stage system, the bandwidth of the original audio signal was limited to an upper frequency limit of 2,000 cps which yields an upper frequency limit of 2,300 cps for the coded audio. This 16-stage system achieves effective scrambling of the audio signal and an acceptable bandwidth at a reasonably low cost. In general, the bandwidth expansion is minimized while the degree of security is optimized by using the largest practical number of samples and reading in a reverse sequence.

It will be understood that the secrecy communication system has been described hereinabove for purposes of illustration and is not intended to indicate limits of the present invention, the scope of which is defined by the following claims.

I claim:

1. A secrecy communication system adapted to be connected to a source of time varying input signals and comprising a plurality of charge storage devices, first circuit means operatively coupled to said charge storage devices and adapted to be coupled to said source to sample consecutive increments of said input signals in a first predetermined order and charge each storage device according to a respective sample, second circuit means coupled to said charge storage devices to read the charge on each storage device and provide a plurality of intermediate output signals arranged in a second predetermined order, and third circuit means coupled to said second circuit means and responsive to said intermediate output signals to sum said intermediate output signals in said second predetermined order and thereby provide a secured output signal having abnormal time variations as compared to said input signals, and wherein said charge storage devices are capacitors, said second circuit means includes a plurality of electronic switch means, each of which is associated with a respective capacitor, each switch means has an input coupled to its associated capacitor and an output coupled to said third circuit means, each switch means is adapted to connect said capacitor to said third circuit means when said switch means is in a first state, and a source of read instruction pulses to sequentially switch said switch means to their first state according to said second predetermined order.

2. The system set forth in claim 1 further comprising means to selectively vary said second predetermined order.

3. The system set forth in claim 1 wherein said consecutive time increments are contiguous and of equal duration and wherein said source is arranged and constructed such that each read instruction pulse has a duration substantially equal to said increment duration.

4. The system set forth in claim 1 wherein said read instruction pulses are coupled to said switch means by code selection circuit means, said code selection circuit means comprises a source of timing pulses and counting means having a plurality of outputs equal in number to said plurality of charge storage devices and responsive to said timing pulses to generate a gate pulse at each counting means output and in a consecutive sequence of gating pulses from a first to a last counting means output, and wherein each switch means is coupled to a respective counting means output to determine said second predetermined order.

5. The system set forth in claim 1 wherein said third circuit means further comprises means to transmit said secured output signal and wherein said system further comprises receiver means adapted to respond to said transmitted output signal to reconstruct said time varying input signals comprising a second plurality of charge storage devices, fourth circuit means operatively coupled to said second charge storage devices and adapted to be coupled to said transmitted output signal to sample consecutive increments of said transmitted output signal in a third predetermined sequence and charge each of said second storage devices according to a respective sample, fifth circuit means coupled to said second storage device to read the charge on each second storage device and provide a plurality of second intermediate output signals, and sixth circuit means coupled to said fourth circuit means and responsive to said second intermediate output signals to sum said second intermediate output signals in a fourth predetermined order correlated to said second predetermined order to thereby reconstruct said time varying input signal.

6. The system set forth in claim 5 wherein said second circuit means further comprises means to generate a sync signal identifying at least one sample in said second predetermined sequence, said transmit means includes means to transmit said sync signal and said receiver means comprises means responsive to said transmitted sync signal to correlate said fourth predetermined order to said second predetermined order.

7. A secrecy communication system adapted to be connected to a source of time varying input signals and comprising a plurality of charge storage devices, first circuit means operatively coupled to said charge storage devices and adapted to be coupled to said source to sample consecutive increments of said input signals in a first predetermined order and charge each storage device according to a respective sample, second circuit means coupled to said charge storage devices to read the charge on each storage device and provide a plurality of intermediate output signals arranged in a second predetermined order, and third circuit means coupled to said second circuit means and responsive to said intermediate output signals to sum said intermediate output signals in said second predetermined order and thereby provide a secured output signal having abnormal time variations as compared to said input signals, and wherein said charge storage devices are capacitors, said first circuit means includes a plurality of first electronic switch means, each of which is associated with a respective capacitor, each switch means has an input adapted to be coupled to said source and an output coupled to its associated capacitor, each switch means is adapted to connect said input signals to its associated capacitor when said switch means is in a first state, and a first pulse source providing sample instruction pulses coupled to said first switch means to sequentially switch said switch means to their first states according to said first predetermined order.

8. The system set forth in claim 7 wherein said consecutive time increments are contiguous and of equal duration and wherein said pulse source is arranged and constructed such that each sample instruction pulse has a duration substantially equal to said increment duration.

9. The system set forth in claim 7 further comprising means to selectively vary said first predetermined order.

10. The system set forth in claim 7 wherein said sample instruction pulses are coupled to said switch means by code selection circuit means and wherein said code selection circuit means comprises a source of timing pulses and counting means having a plurality of outputs equal in number to said plurality of charge storage devices and responsive to said timing pulses to generate a gate pulse at each counting means output and in a consecutive sequence of gating pulses from a first to a last counting means output, and wherein each switch means is coupled to a respective counting means output to determine said first predetermined order.

11. The system set forth in claim 7 wherein said second circuit means includes a plurality of second electronic switch means, each of which is associated with a respective capacitor, each second switch means has an input coupled to its associated capacitor and an output coupled to said third circuit means, each second switch means is adapted to connect said capacitor to said third circuit means when said second switch means is in a first state, and a second pulse source providing read instruction pulses to sequentially switch said second switch means to their first states according to said second predetermined order.

12. The system set forth in claim 1 further comprising means to selectively vary said second predetermined order.

13. The system set forth in claim 11 wherein said consecutive time increments are contiguous and of equal duration and wherein said first and second pulse sources are arranged and constructed such that each sample instruction pulse and each read instruction pulse has a duration substantially equal to said increment duration.

14. The system set forth in claim 11 wherein said read instruction pulses are coupled to said second switch means by code selection circuit means and wherein said code selection circuit means comprises a source of timing pulses and counting means having a plurality of outputs equal in number to said plurality of charge storage devices and responsive to said timing pulses to generate a gate pulse at each counting means output and in a consecutive sequence of gating pulses from a first to a last counting means output, and wherein each of said second switch means is coupled to a respective counting means output to determine said second predetermined order.

15. The system set forth in claim 11 wherein there are at least N number of capacitors and wherein said sample instruction pulses and said read instruction pulses are coupled to said first switch means and said second switch means, respectively, by code selection circuit means which includes said first and said second pulse sources, and wherein said code selection circuit means is arranged and constructed to provide a repetitive sequence of N number of pulses, said first switch means are connected to said code selection circuit means to receive sample instruction pulses to charge said capacitors in a sequence beginning with a first capacitor and ending with the Nth capacitor and said second switch means are coupled to said code selection circuit means to receive read instruction pulses to read the charge on said capacitors in a sequence beginning with said Nth capacitor and ending with said first capacitor.

16. A secrecy communication system adapted to be connected to a source of time varying input signals and comprising a plurality of charge storage devices, first circuit means operatively coupled to said charge storage devices and adapted to be coupled to said source to sample consecutive increments of said input signals in a first predetermined order and charge each storage device according to a respective sample, second circuit means coupled to said charge storage devices to read the charge on each storage device and provide a plurality of intermediate output signals arranged in a second predetermined order, and third circuit means coupled to said second circuit means and responsive to said intermediate output signals to sum said intermediate output signals in said second predetermined order and thereby provide a secured output signal having abnormal time variations as compared to said input signals, and wherein said plurality of charge storage devices comprise at least a first group of capacitors and a second group of capacitors, said first circuit means comprises first and second groups of electronic switch means, each of said switch means in said first group is associated with a respective capacitor in said first capacitor group and has an input connected to said input signal source and an output connected to its associated capacitor, each of said switch means in said second group is associated with a respective capacitor in said second capacitor group and has an input connected to said input signal source and an output connected to its associated capacitor, each switch means is adapted to connect its associated capacitor to said input signal source when said switch means is in a first state, said second circuit means comprises third and fourth groups of electronic switch means, each of said switch means in said third group is associated with a respective capacitor in said first capacitor group and has an input connected to its associated capacitor and an output connected to said third circuit means, each of said switch means in said fourth group is associated with a respective capacitor in said second capacitor group and has an input connected to its associated capacitor and an output connected to said third circuit means, and each switch means in said third and fourth groups is adapted to connect its associated capacitor to said third circuit means when said switch means is in a first state, and wherein said system further comprises code selection circuit means to switch at least one switch means in one of said first or said second switch means groups to its first state and substantially simultaneously switch at least another switch means in one of said third or said fourth switch means groups to its first state.

17. The system set forth in claim 16 wherein said code selection circuit means comprises a source of clock pulses and means responsive to said clock pulses to sequentially distribute sample instruction pulses to all switch means in said one first or second switch means group according to said first predetermined order and substantially simultaneously to sequentially distribute read instruction pulses to all switch means in said one third or fourth switch means group according to said second predetermined order.

18. The system set forth in claim 16 wherein there are N number of capacitors and said code selection circuit means is arranged and constructed to distribute sample instruction pulses to said switch means in said first and second switch means groups to charge said capacitors in a sequence beginning with a first capacitor in said first capacitor group and ending with the Nth capacitor in said second capacitor group and distribute read instruction pulses to said switch means in said third and fourth switch means groups to read the charge on said capacitors in a reverse sequence beginning with the Nth capacitor and ending with said first capacitor.

19. The system set forth in claim 18 wherein said increments are contiguous and have substantially equal durations and wherein each sample instruction pulse and each read instruction pulse has a duration substantially 20. The system set forth in claim 16 wherein said first and second capacitor groups each has N number of capacitors, said code selection circuit means is arranged and constructed to sequentially switch said switch means in said first switch means group to sequentially charge said capacitors in said first capacitor group beginning with the first capacitor in said first capacitor group and ending with the Nth capacitor in said first capacitor group and substantially simultaneously switch said switch means in said fourth switch means group to sequentially read the charge on said capacitors in said second capacitor group beginning with the Nth capacitor in said fourth capacitor group to the first capacitor in said fourth capacitor group and then sequentially switch said switch means in said second switch means group to sequentially charge said capacitors in said second capacitor group beginning with the first capacitor in said second capacitor group and ending with the Nth capacitor in said second capacitor group.

21. A secrecy communication system adapted to be connected to a source of time varying input signals and comprising a plurality of charge storage devices, first circuit means operatively coupled to said charge storage devices and adapted to be coupled to said source to sample consecutive increments of said input signals in a first predetermined order and charge each storage device according to a respective sample, second circuit means coupled to said charge storage devices to read the charge on each storage device and provide a plurality of intermediate output signals arranged in a second predetermined order, and third circuit means coupled to said second circuit means and responsive to said intermediate output signals to sum said intermediate output signals in said second predetermined order and thereby provide a secured output signal having abnormal time variations as compared to said input signals, and wherein said charge storage devices are capacitors, said first circuit means comprises a first source of pulses for timing consecutive sampling of said input signals, said pulses have a time duration substantially equal to said increment and wherein the repetition rate of said pulses is such that respective charges on said capacitors according to said first predetermined order substantially represent contiguous time increments of said input signals.

22. A secrecy communication system adapted to be connected to a source of time varying input signals and comprising a plurality of charge storage devices, first circuit means operatively coupled to said charge storage devices and adapted to be coupled to said source to sample consecutive increments of said input signals in a first predetermined order and charge each storage device according to a respective sample, second circuit means coupled to said charge storage devices to read the charge on each storage device and provide a plurality of intermediate output signals arranged in a second predetermined order, and third circuit means coupled to said second circuit means and responsive to said intermediate output signals to sum said intermediate output signals in said second predetermined order and thereby provide a secured output signal having abnormal time variations as compared to said input signals, and wherein said input signals have a highest significant frequency component of W cycles per second and said input signals are sampled at a rate at least equal to 2W cycles per second.

23. The system set forth in claim 22 wherein said input signals are voice signals and one sample of said input signals is taken approximately every 0.2 milliseconds.

24. The method of encoding time varying input signals to provide a secured output signal comprising sampling consecutive increments of said input signals, charging a plurality of capacitors in a first predetermined sequence with each capacitor being charged according to a respective different one of said samples, reading the charge on said capacitors in a second predetermined sequence to provide intermediate output signals, each of which represents the charge on a respective capacitor, and then summing said intermediate output signals in time sequence to develop said secured output signal, and wherein said input signals have a highest significant frequency component of W cycles per second and said input signals are sampled at a rate at least equal to 2W cycles per second.

25. The method set forth in claim 24 wherein said input signals are voice signals and one sample of said input signals is taken approximately every 0.2 milliseconds.

26. The method set forth in claim 24 wherein said capacitors are arranged in at least one group comprising at least N number of capacitors, said capacitors in said one group are charged in a sequence beginning with a first capacitor and ending with the Nth capacitor and said capacitors in said one group are read in a reverse sequence beginning with said Nth capacitor and ending with said first capacitor.

27. The method set forth in claim 24 wherein said capacitors are arranged in at least two groups, each of which includes at least N number of capacitors, said capacitors in said first group are charged in a sequence beginning with a first capacitor in said first group and ending with the Nth capacitor in said first group, said capacitors in said second group are then charged in a sequence beginning with a first capacitor in said second group and ending with the Nth capacitor in said second group and then said capacitors in said second group are read before said capacitors in said first group are read.

28. The method set forth in claim 27 wherein said capacitors in said second group are read in a sequence beginning with said first capacitor in said second group and ending with said Nth capacitor in said second group.

29. The method set forth in claim 27 wherein said capacitors in said second group are read in a reverse sequence beginning with said Nth capacitor in said second group and ending with said first capacitor in said second group.

* * * * *